(12) United States Patent
Lim et al.

(10) Patent No.: US 12,438,226 B2
(45) Date of Patent: Oct. 7, 2025

(54) BATTERY MODULE FOR VEHICLE (71) Applicants: Hyundai Motor Company, Seoul (KR); Kia Corporation, Seoul (KR); Hyundai Mobis Co., Ltd., Seoul (KR)

(72) Inventors: Jun Young Lim, Seoul (KR); Seong Min Kim, Hwaseong-si (KR); Byung Su Kim, Incheon (KR); Geum Hyeon Lee, Ansan-si (KR); Jin ho You, Seoul (KR)

(73) Assignees: Hyundai Motor Company, Seoul (KR); Kia Corporation, Seoul (KR); HYUNDAI MOBIS CO., LTD., Seoul (KR)

( * ) Notice: Subject to any disclaimer, the term of this patent is extended or adjusted under 35 U.S.C. 154(b) by 501 days.

(21) Appl. No.: 17/987,023

(22) Filed: Nov. 15, 2022

(65) Prior Publication Data
US 2023/0411766 A1 Dec. 21, 2023

(30) Foreign Application Priority Data
Jun. 20, 2022 (KR) ........................ 10-2022-0074974

(51) Int. Cl.
*H01M 50/291* (2021.01)
*B60L 50/64* (2019.01)
(Continued)

(52) U.S. Cl.
CPC ....... *H01M 50/291* (2021.01); *H01M 10/482* (2013.01); *H01M 10/486* (2013.01);
(Continued)

(58) Field of Classification Search
CPC ............. H01M 50/291; H01M 50/209; H01M 50/249; H01M 50/271; H01M 50/514;
(Continued)

(56) References Cited

U.S. PATENT DOCUMENTS 10,481,208 B2 11/2019 Lee et al.
2003/0146734 A1 8/2003 Kozu et al.
(Continued)

FOREIGN PATENT DOCUMENTS

JP 2020514985 A 5/2020
KR 20150062777 A 6/2015
(Continued)

*Primary Examiner* — Eugenia Wang
(74) *Attorney, Agent, or Firm* — Slater Matsil, LLP (57) ABSTRACT

An embodiment battery module for a vehicle includes first and second battery cells each having a planar shape, each battery cell being extended in one direction and including a positive electrode and a negative electrode separated from each other in a widthwise direction of the battery cells, and a main cartridge including an insertion space in which the battery cells are slidably inserted with the electrodes arranged alternately in a stacking direction and protruding outwards, wherein a stepped portion is provided in an inward end portion of the insertion space, inner surfaces of the stepped portion that are in contact with each end portion of the battery cells are spaced apart from each other in a sliding direction of the battery cells, and the end portions of the electrodes are in contact and overlap with each other when the electrodes are bent in the stacking direction to be connected to each other.

20 Claims, 8 Drawing Sheets (51) Int. Cl.
  *H01M 10/48* (2006.01)
  *H01M 50/209* (2021.01)
  *H01M 50/249* (2021.01)
  *H01M 50/271* (2021.01)
  *H01M 50/514* (2021.01)
  *H01M 50/55* (2021.01)
  *H01M 50/557* (2021.01)
  *H01M 50/569* (2021.01)

(52) U.S. Cl.
  CPC ....... *H01M 50/209* (2021.01); *H01M 50/249* (2021.01); *H01M 50/271* (2021.01); *H01M 50/514* (2021.01); *H01M 50/55* (2021.01); *H01M 50/557* (2021.01); *H01M 50/569* (2021.01); *B60L 50/64* (2019.02); *H01M 2220/20* (2013.01)

(58) Field of Classification Search
  CPC .. H01M 50/55; H01M 50/557; H01M 50/569; H01M 50/211; H01M 10/482; H01M 2220/20; B60L 50/64
  See application file for complete search history.

(56) References Cited

U.S. PATENT DOCUMENTS

| | | |
|---|---|---|
| 2019/0267603 A1 | 8/2019 | Chi et al. |
| 2021/0280926 A1* | 9/2021 | Jansen ................ H01M 50/284 |
| 2022/0181749 A1 | 6/2022 | Lee et al. |

FOREIGN PATENT DOCUMENTS

| | | |
|---|---|---|
| KR | 20180091580 A | 8/2018 |
| KR | 20210058478 A | 5/2021 |
| KR | 102266995 B1 | 6/2021 |
| WO | 0169699 A1 | 9/2001 |

* cited by examiner

BATTERY MODULE FOR VEHICLE

CROSS-REFERENCE TO RELATED APPLICATIONS

This application claims the benefit of Korean Patent Application No. 10-2022-0074974, filed on Jun. 20, 2022, which application is hereby incorporated herein by reference.

TECHNICAL FIELD

The disclosure relates to a battery module for a vehicle.

BACKGROUND

Electric vehicles employ secondary batteries that are repeatedly rechargeable and reusable. With the technical advancement, the secondary batteries have increased energy and power densities, and have also had a longer life. The secondary batteries are used in electric vehicles (EVs), hybrid electric vehicles (HEVs), plug-in hybrid electric vehicles (PHEVs), etc.

Battery cells different in size and shape, for example, lithium-ion batteries are manufactured and then assembled into various types of packs. Sometimes, secondary battery packs for vehicles are packed with hundreds or thousands of battery cells to meet the needs of typically desired power and capacity.

To comply with the regulations for crashes such as side crashes, the battery pack is reinforced with a reinforcing member that connects left, right and underside structures. Therefore, a conventional battery pack has a narrow battery stacking space and is heavy in weight. This problem eventually causes decrease in a travel distance.

Meanwhile, functions of preventing leakage and maintaining constant temperature are essential for the battery pack. Accordingly, a new structure for a battery module and a battery pack is needed to load more batteries, and satisfy various required performances and functions including crash safety.

Matters described as the related art are provided merely for promoting understanding for the background of embodiments of the disclosure, and should not be taken as the prior art already known to a person having ordinary knowledge in the art.

SUMMARY

The disclosure relates to a battery module for a vehicle. Particular embodiments relate to a battery module where a plurality of battery cells are connected to each other via electrodes.

An embodiment of the disclosure provides a battery module for a vehicle, in which an end portion of a main cartridge with a pair of battery cells inserted therein is formed with a stepped portion, and end portions of electrodes are in contact and overlap with each other when the electrodes of the battery cells are bent to be connected to each other, and welded to a sensing board provided with a busbar.

According to an embodiment of the disclosure, a battery module for a vehicle includes first and second battery cells each having a planar shape, extended toward one side, and including a positive electrode and a negative electrode separated from each other in a widthwise direction of the cells, and a main cartridge including an insertion space in which the first battery cell and the second battery cell are slidably inserted with the positive electrodes and the negative electrodes arranged alternately in a stacking direction and protruding outwards, including a stepped portion formed in an inward end portion of the insertion space and including inner surfaces each of which is in contact with each end portion of the first and second battery cells and which are spaced apart from each other in a sliding direction of the first and second battery cells, and making the end portions of the positive electrodes and the negative electrodes be in contact and overlap with each other when the positive electrodes and the negative electrodes of the first and second battery cells are bent in the stacking direction to be connected to each other.

The battery module may further include a sub-cartridge to cover a space between the first battery cell and the second battery cell at an inlet side of the insertion space of the main cartridge.

The sub-cartridge may include a first rib extended in one direction, formed at a position corresponding to one of the positive electrode and the negative electrode, and including a supporting protrusion supporting the end portion of the electrode when the electrode is bent.

The main cartridge may include a second rib extended in one direction at the inlet side where the battery cells are inserted, positioned at an opposite side to the first rib to prevent a short-circuit when the electrodes are bent, and including a supporting protrusion supporting the end portion of the electrode.

The main cartridge may include an opening through which one planar surface of the first or second battery cell inserted therein is exposed to an outside.

The battery module may further include a cover to cover the opening of the main cartridge.

The cover may include a third rib extended in one direction and including a supporting protrusion supporting the end portion of the electrode when the electrode is bent.

A plurality of main cartridges, in which the first and second battery cells are inserted, may be stacked on each other in a direction of stacking the first and second battery cells.

Directions where the positive electrode of the first battery cell and the negative electrode of the second battery cell are bent may be opposite to directions where the negative electrode of the first battery cell and the positive electrode of the second battery cell are bent.

The battery module may further include a sensing board to couple with a plurality of stacked main cartridges in which the first battery cell and the second battery cell are inserted, and connect the plurality of electrodes.

The sensing board may include an insertion hole in which the electrode is inserted, and the positive electrodes and the negative electrodes of the first and second battery cells are bent and welded to the sensing board.

The sensing board may include a temperature sensor to measure temperature of the first battery cell and the second battery cell, and a voltage sensor to measure voltage of the first battery cell and the second battery cell.

A height difference of the stepped portion may be a distance between the electrode of the first battery cell and the electrode of the second battery cell.

In a battery module for a vehicle according to embodiments of the disclosure, an end portion of a main cartridge with a pair of battery cells inserted therein is formed with a stepped portion, and end portions of electrodes are in contact and overlap with each other when the electrodes of the battery cells are bent to be connected to each other, thereby having an effect on reducing electrode damage caused when the electrodes are bent.

Further, a sub-cartridge is disposed at a lower side of the electrode to be bent and supports the lower side of the electrode when the electrode is bent, thereby having an effect on bending the electrode safely.

In addition, the plurality of main cartridges is stacked to overlap, and the battery cells are inserted into the main cartridge leaving a height difference therebetween, so that the electrodes can be bent in one direction as pairs of electrodes of different battery cells are bent, thereby having an effect on simplifying a bending process.

DETAILED DESCRIPTION OF ILLUSTRATIVE EMBODIMENTS

Regarding embodiments of the disclosure disclosed in this specification or application, the specific structural or functional description is merely illustrative for the purpose of describing the embodiments of the disclosure, and embodiments of the disclosure may be implemented in various forms but should not be construed as being limited to the embodiments set forth in this specification or application.

Because the embodiments of the disclosure may be variously modified and have various forms, specific exemplary embodiments will be illustrated in the drawings and described in detail in this specification or application. However, it should be understood that embodiments of the disclosure are intended not to be limited to the specific embodiments but to cover all modifications, equivalents or alternatives without departing from the spirit and technical scope of the disclosure.

In embodiments of the present specification, terms such as "first" and "second" may be used to describe various components, but the components should not be limited by the above terms. In addition, the above terms should not be interpreted as limiting the order of each component but may be used for the purpose of distinguishing one component from another. For example, a "first element" could be termed a "second element," and similarly, a "second element" could also be termed a "first element".

In embodiments of the present specification, when it is described that one component is "connected" or "joined" to another component, it should be understood that the one component may be directly connected or joined to another component, but additional components may be present therebetween. However, when one component is described as being "directly connected" or "directly coupled" to another component, it should be understood that additional components may be absent between the one component and another component. Other expressions describing the relationship between components, such as "between," "directly between," and the like should be interpreted in the same way.

Terms used in this specification are merely used for explaining specific embodiments, but are not intended to limit the disclosure. Unless the context clearly dictates otherwise, singular forms include plural forms as well. In embodiments of the disclosure, it should be understood that the term "include" or "have" indicates that a feature, a number, a step, an operation, an element, a part, or the combination thereof described in the embodiments is present, but does not preclude a possibility of presence or addition of one or more other features, numbers, steps, operations, elements, parts or combinations thereof, in advance.

Unless defined otherwise, all terms used herein including technical or scientific terms have the same meanings as those generally understood by a person having ordinary knowledge in the art to which the disclosure pertains. The terms such as those defined in generally used dictionaries are construed to have meanings matching that in the context of related technology and, unless clearly defined otherwise, are not construed to be ideally or excessively formal.

For example, the term "positive electrode" used herein may be replaced with "anode", and the term "negative electrode" used herein may be replaced with "cathode". Additionally, in the present specification, the terms 'positive electrode' and 'negative electrode' do not refer to the entire electrode structures with active material, but instead to the electrode terminals (leads, tabs, or terminals) that are connected to the outside of the battery cell. For example, "positive electrode" may refer to "a positive electrode terminal", and "negative electrode" may refer to "a negative electrode terminal".

Below, embodiments of the disclosure will be described in detail with reference to the accompanying drawings. In the accompanying drawings, like numerals refer to like elements throughout.

Figure 1:
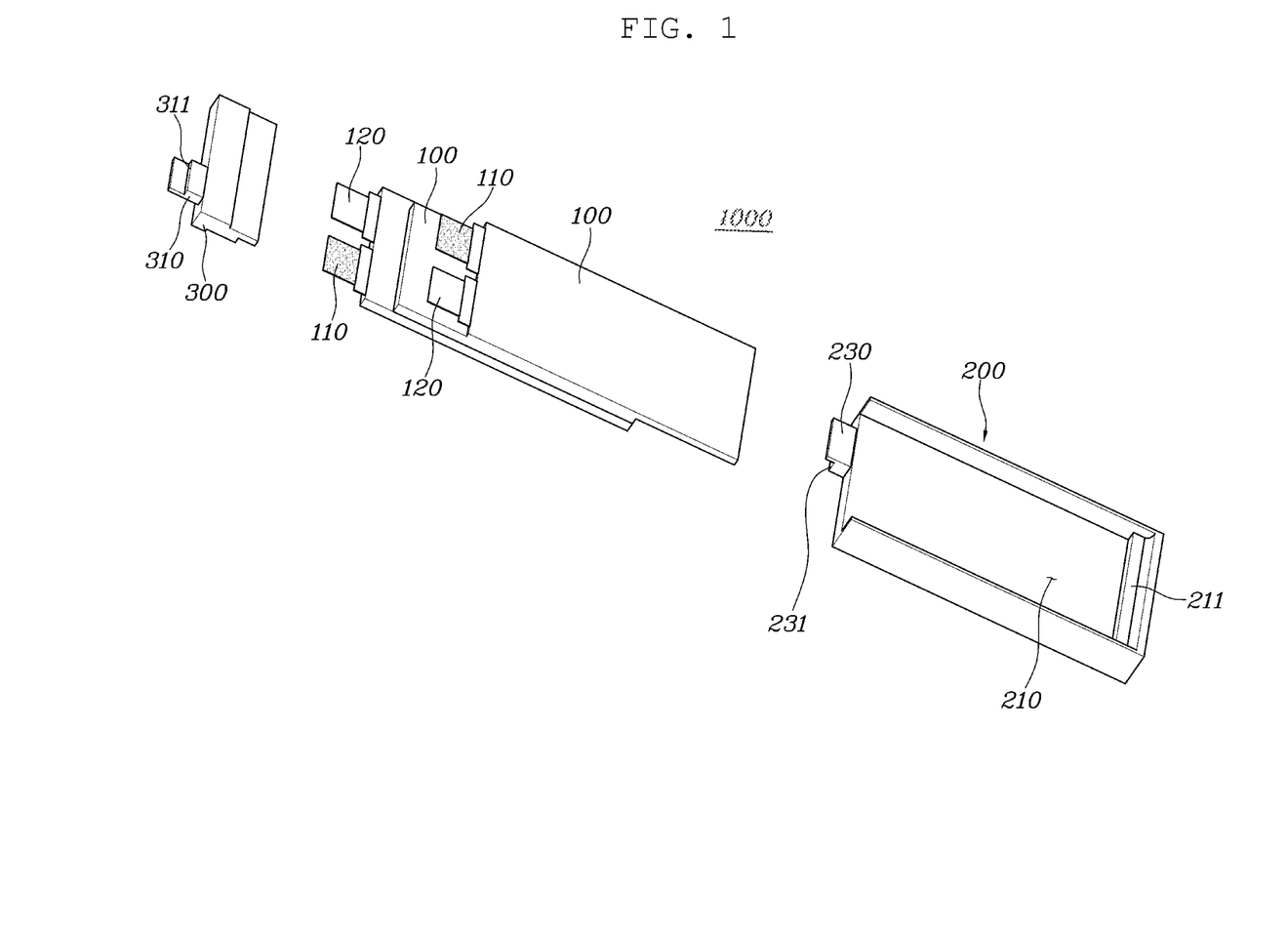
FIG. 1 is an exploded perspective view of a main cartridge and a battery cell in a battery module for a vehicle according to an embodiment of the disclosure.
Figure 2:
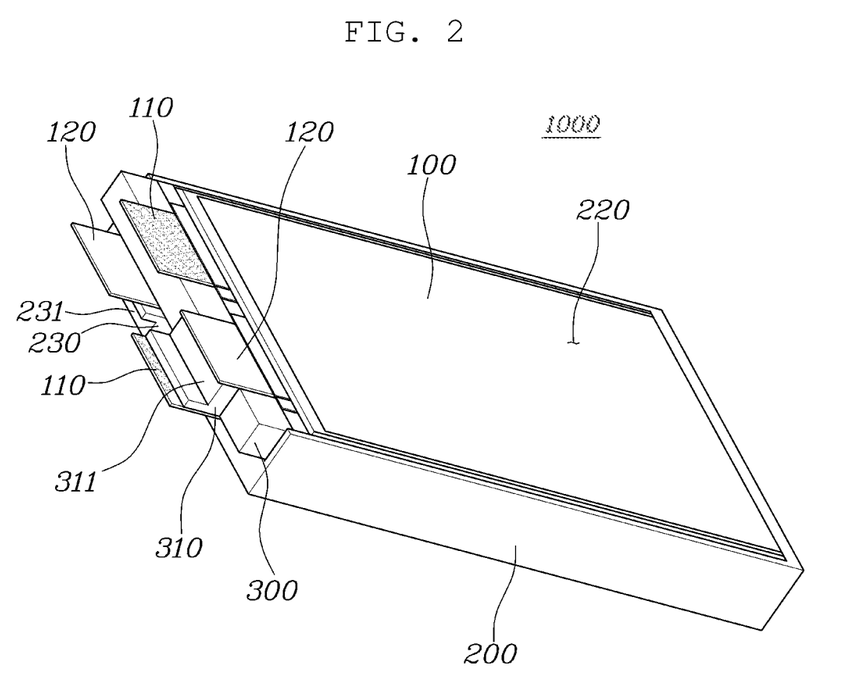
FIG. 2 is an assembled perspective view of a main cartridge and a battery cell in a battery module for a vehicle according to an embodiment of the disclosure.
Figure 3:
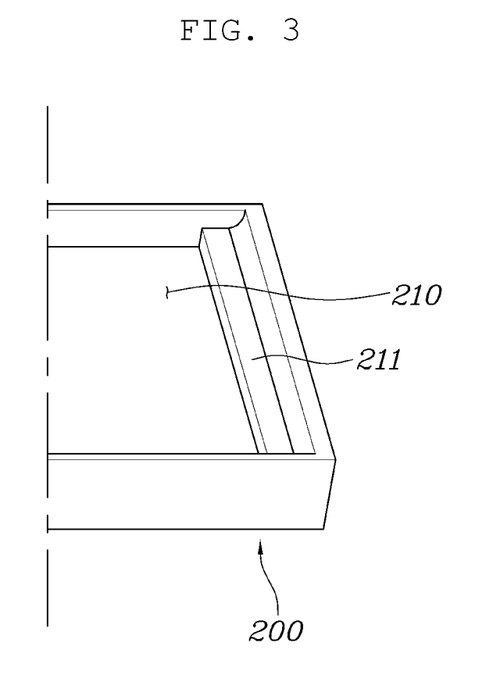
FIG. 3 is a perspective view showing a stepped portion of a main cartridge in a battery module for a vehicle according to an embodiment of the disclosure.
Figure 4:
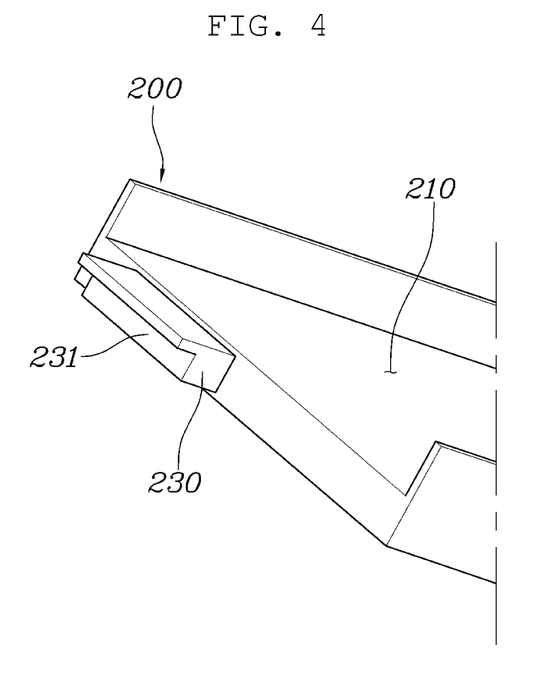
FIG. 4 is a perspective view showing an insertion space of a main cartridge at an inlet side in a battery module for a vehicle according to an embodiment of the disclosure.
Figure 5:
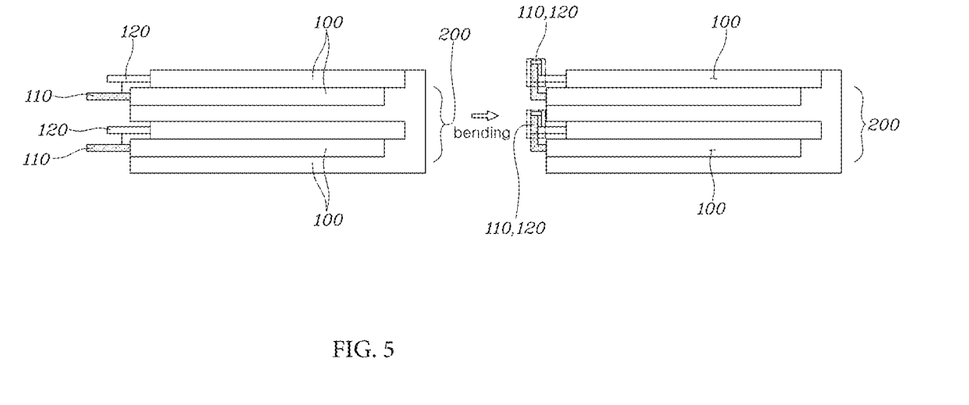
FIG. 5 is a lateral cross-sectional view of a battery module for a vehicle according to an embodiment of the disclosure.

FIG. 1 is an exploded perspective view of a main cartridge 200 and a battery cell 100 in a battery module 1000 for a vehicle according to an embodiment of the disclosure, FIG. 2 is an assembled perspective view of the main cartridge 200 and the battery cell 100 in the battery module 1000 for the vehicle according to an embodiment of the disclosure, FIG. 3 is a perspective view showing a stepped portion 211 of the main cartridge 200 in the battery module 1000 for the vehicle according to an embodiment of the disclosure, FIG. 4 is a perspective view showing an insertion space 210 of the main cartridge 200 at an inlet side in the battery module 1000 for the vehicle according to an embodiment of the disclosure, and FIG. 5 is a lateral cross-sectional view of the battery module 1000 for the vehicle according to an embodiment of the disclosure.

Embodiments of the battery module 1000 for the vehicle according to embodiments of the disclosure will be described with reference to FIGS. 1 to 5.

The battery module 1000 for the vehicle according to embodiments of the disclosure includes first and second battery cells 100 each having a planar shape, extended in one direction, and provided with a positive electrode 110 and a negative electrode 120 separated from each other, and the main cartridge 200 formed with an insertion space 210 in which the first battery cell 100 and the second battery cell 100 are slidably inserted with the positive electrodes 110 and the negative electrodes 120 arranged alternately and protruding outwards, including a stepped portion 211 formed in an inward end portion of the insertion space 210 and having inner surfaces each of which is in contact with each end portion of the first and second battery cells 100 and which are spaced apart from each other in a sliding direction of the first and second battery cells 100, and making the end portions of the positive electrodes 110 and the negative electrodes 120 be in contact and overlap with each other when the positive electrodes 110 and the negative electrodes 120 of the first and second battery cells 100 are bent in a stacking direction to be connected to each other.

As shown in FIGS. 1 to 4, the battery cell 100 is shaped like a flat plate and formed with the positive electrode 110 and the negative electrode 120 extended being spaced apart from each other toward one side. The battery cell 100 may include the first battery cell 100 and the second battery cell 100 which form a pair.

The main cartridge 200 is formed with the insertion space 210 in which the first battery cell 100 and the second battery cell 100 are inserted. The first battery cell 100 and the second battery cell 100 may be slidably inserted into the main cartridge 200 in a direction opposite to the extending direction of the electrodes 110 and 120.

As shown in FIG. 3, the inward end portion of the insertion space 210 of the main cartridge 200, which is formed in a direction where the battery cell 100 slides, may include the stepped portion 211 formed so that the first battery cell 100 and the second battery cell 100 can be inserted stepwise leaving a height difference. As shown in FIG. 2, when the battery cells 100 slide up to the end, the electrodes 110 and 120 of the battery cells 100 may be stepwise positioned. In this case, the first battery cell 100 and the second battery cell 100 may be inserted into the main cartridge 200 so that the electrodes 110 and 120 can be adjacent to the opposite electrodes 120 and 110.

As shown in FIG. 5, the adjacent electrodes 110 and 120 may be connected to each other as being bent after the first battery cell 100 and the second battery cell 100 slide up to the end. In this case, the electrodes 110 and 120 to be bent include both the positive electrode 110 and the negative electrode 120, and the end portions thereof can be in contact with each other when the bending is completed.

Thus, bending in one direction is possible using a bending tool, thereby having an effect on eliminating a bending process using separate bending equipment.

Further, the height difference of the stepped portion 211 may be a distance between the electrodes 110 and 120 of the first battery cell 100 and the electrodes 110 and 120 of the second battery cell 100.

In this way, when the electrodes 110 and 120 of the first and second battery cells 100 are bent, the end portions of the electrodes 110 and 120 are in contact with each other.

At the inlet side of the insertion space 210 of the main cartridge 200, a sub-cartridge 300 may be further included to cover a space between the first battery cell 100 and the second battery cell 100.

As shown in FIGS. 1 to 5, after the first battery cell 100 and the second battery cell 100 are completely inserted in the insertion space 210 of the main cartridge 200, the sub-cartridge 300 may be inserted in the insertion space 210 to cover the space between the first battery cell 100 and the second battery cell 100 at the inlet side of the main cartridge 200.

Thus, when the positive electrodes 110 and the negative electrodes 120 of the first and second battery cells 100 are bent to connect with each other, the sub-cartridge 300 supports the lower sides of the positive and negative electrodes 110 and 120 to be bent, thereby having an effect on preventing the electrodes 110 and 120 from being damaged during the bending process for the electrodes 110 and 120, and further having an effect on preventing the battery cells from protruding out of the main cartridge 200.

The main cartridge 200 may include an opening 220 through which one planar surface of the first or second battery cell 100 inserted therein is exposed to the outside.

As shown in FIGS. 1 to 2, the main cartridge 200 may include the opening 220 formed by opening one side of the insertion space 210 so that one planar surface of the battery cell 100 can be exposed to the outside.

Thus, one planar surface of the first battery cell 100 and the second battery cell 100 is exposed to the outside, so that heat generated while the battery cell 100 is operating can be discharged to the outside, thereby having an effect on prolonging the life of the battery cell 100.

Figure 6:
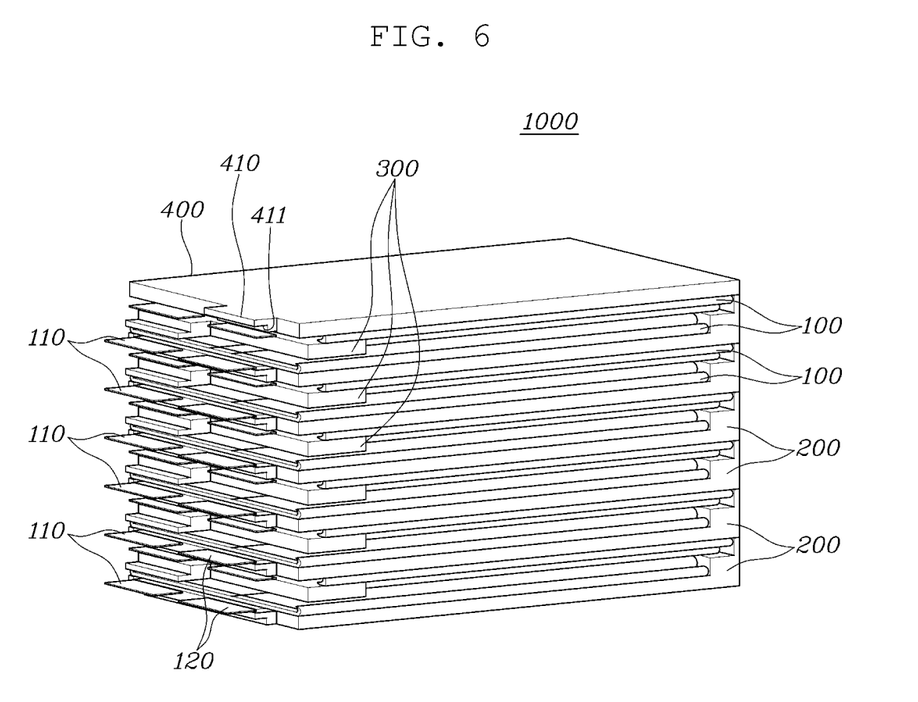
FIG. 6 is a perspective view showing a plurality of battery cells provided in a battery module for a vehicle according to an embodiment of the disclosure.

FIG. 6 is a perspective view showing a plurality of battery cells 100 provided in the battery module 1000 for a vehicle according to an embodiment of the disclosure.

As shown in FIG. 6, a plurality of main cartridges, in which the first and second battery cells 100 are inserted, are coupled to each other in a direction where the first and second battery cells 100 are stacked, and the electrodes 110 and 120 are bent and connected to each other.

In this way, the plurality of first and second battery cells 100 are connectable to each other, and the upper main cartridge 200 is usable for covering the opening 220 so as to prevent the battery cells 100 inserted in the main cartridge 200 from being separated outwards through the opening 220. Further, it is designable to add the battery cells 100 as much as the battery capacity required for a vehicle.

In addition, a cover 400 for covering the opening 220 of the main cartridge 200 may be further provided.

As shown in FIG. 6, the cover 400 may be provided to cover the topmost opening 220 of the plurality of stacked main cartridges 200 in which the battery cells 100 are inserted.

In this way, all the planar surfaces of the battery cells 100 inserted in the main cartridges 200 are covered, so that the main cartridges 200 can be improved in a stacking degree of freedom.

Figure 7:
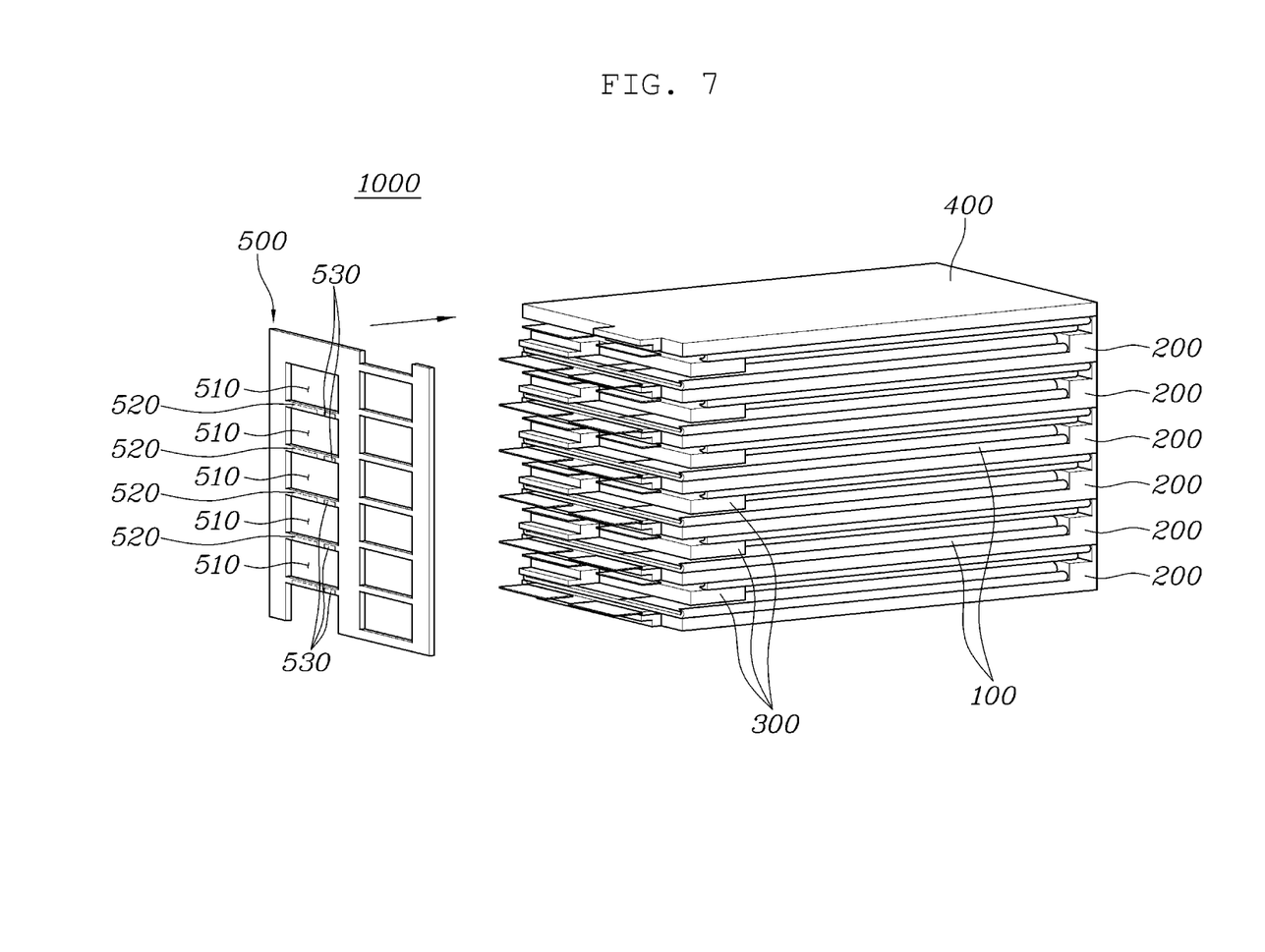
FIG. 7 is a perspective view showing that a sensing board is coupled to a battery module for a vehicle according to an embodiment of the disclosure.
Figure 8:
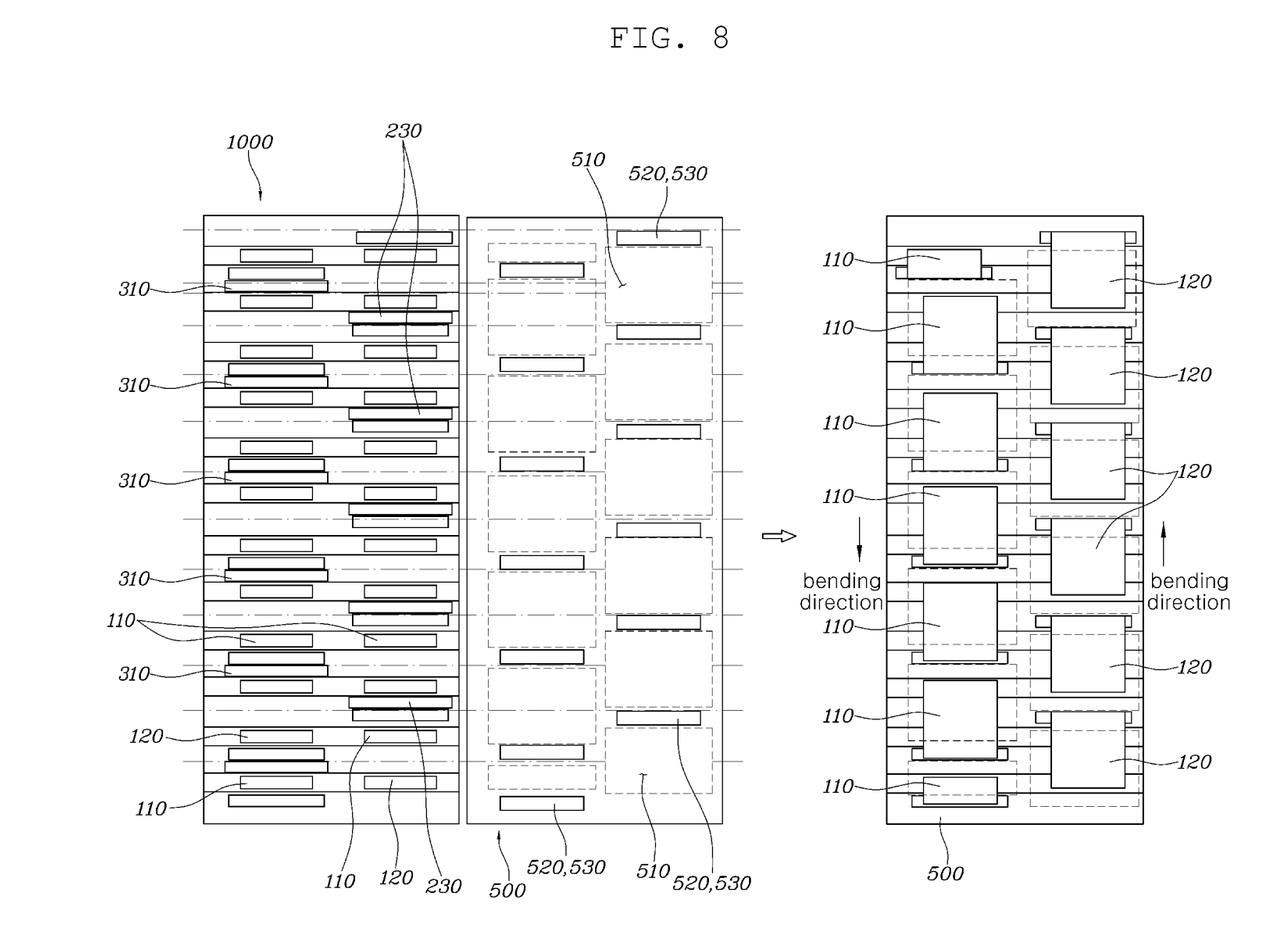
FIG. 8 is a front view showing an order in which a sensing board is coupled to a battery module for a vehicle according to an embodiment of the disclosure.

FIG. 7 is a perspective view showing that a sensing board 500 is coupled to the battery module 1000 for a vehicle according to an embodiment of the disclosure, and FIG. 8 is a front view showing an order in which the sensing board 500 is coupled to the battery module 1000 for a vehicle according to an embodiment of the disclosure.

The sensing board 500 may be further provided to couple with the plurality of stacked main cartridges 200, in which the first and second battery cells 100 are inserted, thereby connecting the plurality of electrodes 110 and 120.

As shown in FIG. 7, the sensing board 500 is coupled to the plurality of stacked and coupled main cartridges 200, thereby connecting all of the plurality of bent and connected positive and negative electrodes 110 and 120 and serving as a busbar for connection with the outside.

In this way, the separate first and second battery cells 100 are integrated into one, and the first and second battery cells 100 are connectable to a motor, a power device and the like device that requires electric power in a vehicle.

The sensing board 500 is formed with an insertion hole 510 through which the electrodes 110 and 120 pass, and the positive and negative electrodes 110 and 120 of the first battery cell 100 and the positive and negative electrodes 110 and 120 of the second battery cell 100 are bent and welded to the sensing board 500 via the insertion hole 510.

As shown in FIG. 8, the sensing board 500 is formed with the insertion hole 510 in which the positive and negative electrodes 110 and 120 are inserted, and the positive and negative electrodes 110 and 120 of the first battery cell 100 and the positive and negative electrodes 110 and 120 of the second battery cell 100 pass through the insertion hole 510 and are then bent and welded to the sensing board 500.

Thus, the battery cell 100 is connectable to the sensing board 500. Here, the electrodes 110 and 120 may be connected to the sensing board 500 by other methods than the welding.

The positive electrode 110 and the negative electrode 120 of the battery cell 100 may be bent in opposite directions.

As shown in FIG. 8, the positive electrode 110 and the negative electrode 120 of the first battery cell 100 may be bent in opposite directions and respectively connected to the negative electrode 120 and the positive electrode 110 of the different second battery cells 100.

In this way, all the battery cells 100 are organically connectable to each other. Thus, even though any one of the plurality of battery cells 100 has trouble and does not operate, the other battery cells 100 can operate normally. Thereafter, only the battery cell 100 that operates abnormally is replaceable during maintenance, thereby improving the convenience of maintenance.

Further, the sensing board 500 may include a temperature sensor 530 for measuring the temperature of the battery cell 100 and a voltage sensor 520 for measuring voltage.

As shown in FIG. 8, the sensing board 500, to which the positive electrode 110 and the negative electrode 120 are bent and welded, includes the temperature sensor 530 for measuring the temperature in a portion where the positive electrode 110 and the negative electrode 120 are bent and welded, and the voltage sensor 520 for measuring the voltage, thereby detecting the temperature of the battery cell 100 due to heat generated during the operation of the battery cell 100, and measuring an electric current that the battery cell 100 supplies to the electronic devices of the vehicle. When the detected temperature and the measured current are higher than preset reference values, the temperature sensor 530 and the voltage sensor 520 may identify that the battery cell 100 operates abnormally. When the abnormal operation is identified, a controller of the vehicle warns a driver so that the driver can quickly repair the battery cell 100.

In this way, it is possible to prevent the battery cell 100 from being overheated and damaging other battery cells 100 or to prevent the power from being abnormally output and deteriorating the functions of the vehicle.

The sub-cartridge 300 may include a first rib 310 extended in one direction, formed at a position corresponding to one of the positive electrode 110 and the negative electrode 120, and formed with a supporting protrusion 311 supporting the end portions of the electrodes 110 and 120 when the electrodes 110 and 120 are bent. The main cartridge 200 may include a second rib 230 extended in one direction at the inlet side where the first battery cell 100 and the second battery cell 100 are inserted, positioned at the opposite side to the first rib 310, preventing a short-circuit when the electrodes 110 and 120 are bent, and formed with a supporting protrusion 231 supporting the end portions of the electrodes 110 and 120 when the electrodes 110 and 120 are bent. The cover 400 may include a third rib 410 extended in one direction and formed with a supporting protrusion 411 supporting the end portions of the electrodes 110 and 120 when the electrodes 110 and 120 are bent.

As shown in FIGS. 6 and 8, the first rib 310, the second rib 230, and the third rib 410 may be formed zigzag with each other, and formed to block spaces between the positive electrodes 110 and the negative electrodes 120 bent in opposite directions to each other, thereby having an effect on preventing a short-circuit between the battery cells 100 when the plurality of main cartridges 200 are stacked with the battery cells 100 inserted therein.

Further, the insertion holes 510 formed in the sensing board 500 may be large enough to insert one among the first rib 310, the second rib 230, and the third rib 410 and to insert the positive electrode 110 and the negative electrode 120 therein. After the positive electrode 110 and the negative electrode 120 are bent, the end portions thereof may be supported by the supporting protrusions 231, 311, and 411.

Although specific embodiments of the disclosure are illustrated and described, it will be obvious to a person having ordinary knowledge in the art that a variety of improvements and changes can be made in the disclosure without departing from the technical idea of the disclosure defined in the appended claims.

What is claimed is:

1. A battery module for a vehicle, the battery module comprising:
   a first battery cell, wherein:
      the first battery cell has a planar shape,
      the first battery cell extends in one direction, and
      the first battery cell comprises a first positive electrode and a first negative electrode;
   a second battery cell, wherein:
      the second battery cell has the planar shape,
      the second battery cell extends in the one direction, and
      the second battery cell comprises a second positive electrode and a second negative electrode; and
   a main cartridge,
   wherein:
      the main cartridge comprises an insertion space in which the first battery cell and the second battery cell are slidably inserted,
      the first positive electrode and the second negative electrode are arranged alternately in a stacking direction and protrude outwards,
      the first negative electrode and the second positive electrode are arranged alternately in the stacking direction and protrude outwards,
      a stepped portion is provided in an inward end portion of the insertion space,
      a first inner surface of the stepped portion is in contact with a first inward end portion of the first battery cell,
      a second inner surface of the stepped portion is in contact with a second inward end of the second battery cell,
      the first inner surface of the stepped portion and the second inner surface of the stepped portion are spaced apart from each other in a sliding direction of the first battery cell and the second battery cell, a first positive electrode end portion of the first positive electrode and a second negative electrode end portion of the second negative electrode are in contact with and overlap each other when the first positive electrode and the second negative electrode are bent in the stacking direction to be connected to each other, and a first negative electrode end portion of the first negative electrode and a second positive electrode end portion of the second positive electrode are in contact with and overlap each other when the first negative electrode and the second positive electrode are bent in the stacking direction to be connected to each other.

2. The battery module of claim 1, further comprising a sub-cartridge to cover a space between the first battery cell and the second battery cell at an inlet side of the insertion space of the main cartridge.

3. The battery module of claim 2, wherein:
the sub-cartridge comprises a first rib extended in a particular direction,
the first rib is provided at a position corresponding to the first positive electrode and the second negative electrode, and
the first rib comprises a first supporting protrusion supporting the first positive electrode end portion of the first positive electrode or the second negative electrode end portion of the second negative electrode when the first positive electrode or the second negative electrode is bent.

4. The battery module of claim 3, wherein:
the main cartridge comprises a second rib extended in the particular direction at the inlet side where the first battery cell and the second battery cell are inserted,
the second rib is positioned at an opposite side to the first rib in order to prevent a short-circuit when at least one of the first positive electrode, the first negative electrode, the second positive electrode, and the second negative electrode are bent, and
the second rib comprises a second supporting protrusion supporting a respective end portion of at least one of the first positive electrode, the first negative electrode, the second positive electrode, or the second negative electrode.

5. The battery module of claim 1, wherein the main cartridge further comprises an opening through which one planar surface of the first battery cell or the second battery cell inserted therein is exposed to an outside.

6. The battery module of claim 5, further comprising a cover covering the opening of the main cartridge.

7. The battery module of claim 6, wherein:
the cover comprises a third rib extended in a particular direction, and
the third rib comprises a supporting protrusion supporting a respective end portion of at least one of the first positive electrode, the first negative electrode, the second positive electrode, or the second negative electrode when the first positive electrode, the first negative electrode, the second positive electrode, or the second negative electrode is bent.

8. The battery module of claim 1, wherein a height difference of the stepped portion is a distance between the first positive electrode of the first battery cell and the second negative electrode of the second battery cell, or between the first negative electrode of the first battery cell and the second positive electrode of the second battery cell.

9. A battery module for a vehicle, the battery module comprising:
a plurality of pairs of battery cells, each pair having a respective first battery cell and a respective second battery cell, wherein:
each battery cell of the plurality of pairs of battery cells has a planar shape,
each battery cell of the plurality of pairs of battery cells is extended in one direction, and
each battery cell of the plurality of pairs of battery cells comprises a respective positive electrode and a respective negative electrode separated from each other in a battery cell widthwise direction; and
a plurality of main cartridges stacked on each other in a stacking direction, wherein:
each main cartridge of the plurality of main cartridges comprises a respective insertion space in which the respective first battery cell and the respective second battery cell of a respective one of the plurality of pairs of battery cells are slidably inserted with the respective positive electrodes and the respective negative electrodes arranged alternately in the stacking direction and protruding outwards,
wherein:
respective stepped portions are provided in respective inward end portions of the respective insertion spaces,
respective inner surfaces of the respective stepped portions that are in contact with respective end portions of the respective first battery cell and the respective second battery cell of each of the plurality of pairs of battery cells are spaced apart from each other in a sliding direction of the plurality of pairs of battery cells, and
respective end portions of the respective positive electrodes and the respective negative electrodes are in contact and overlap with each other when the respective positive electrodes and the respective negative electrodes of the respective first battery cell and the respective second battery cell of each of the plurality of pairs of battery cells are bent in the stacking direction to be connected to each other.

10. The battery module of claim 9, wherein directions where the respective positive electrodes of each respective first battery cell and the respective negative electrodes of each respective second battery cell are bent are opposite to directions where the respective negative electrodes of each respective first battery cell and each the respective positive electrodes of each respective second battery cell are bent.

11. The battery module of claim 9, further comprising:
a sensing board coupled with the plurality of main cartridges,
wherein the sensing board is connected to the respective positive electrodes and the respective negative electrodes of the plurality of pairs of battery cells.

12. The battery module of claim 11, wherein:
the sensing board comprises an insertion hole through which the respective positive electrodes and the respective negative electrodes of the plurality of pairs of battery cells are inserted, and
the respective positive electrodes and the respective negative electrodes of the plurality of pairs of battery cells are bent and welded to the sensing board.

13. The battery module of claim 11, wherein the sensing board comprises:

a temperature sensor; and a voltage sensor.

14. The battery module of claim 9, further comprising a plurality of sub-cartridges, each sub-cartridge being configured to cover a respective space between the respective first battery cell and the respective second battery cell of the plurality of pairs of battery cells at an inlet side of the respective insertion space of a respective one of the plurality of main cartridges.

15. The battery module of claim 14, wherein:

each of the plurality of sub-cartridges comprises a respective first rib extended in a particular direction, each of the respective first ribs is provided at a position corresponding to a respective first positive electrode of the respective first battery cell and a respective second negative electrode of the respective second battery cell, and each of the respective first ribs comprises a respective first supporting protrusion supporting a respective end portion of a respective one of the respective first positive electrode or the respective second negative electrode when the respective first positive electrode or the respective second negative electrode is bent.

16. The battery module of claim 15, wherein:

each of the plurality of main cartridges comprises a respective second rib extended in the particular direction at the inlet side where the plurality of pairs of battery cells are inserted, each of the respective second ribs are positioned at an opposite side to the respective first ribs in order to prevent a short-circuit when at least one of the respective positive electrodes and the respective negative electrodes are bent, and each of the respective second ribs comprise a respective second supporting protrusion supporting at least one other respective end portion of one of the respective positive electrodes or the respective negative electrodes.

17. A vehicle comprising:

a vehicle body;

a battery module disposed within the vehicle body, wherein the battery module comprises:

a plurality of pairs of battery cells, each pair having a respective first battery cell and a respective second battery cell, wherein:

each battery cell of the plurality of pairs of battery cells has a planar shape, each battery cell of the plurality of pairs of battery cells is extended in one direction, and each battery cell of the plurality of pairs of battery cells comprises a respective positive electrode and a respective negative electrode separated from each other in a battery cell widthwise direction; and a plurality of main cartridges stacked on each other in a stacking direction, wherein:

each main cartridge of the plurality of main cartridges comprises a respective insertion space in which the respective first battery cell and the respective second battery cell of a respective one of the plurality of pairs of battery cells are slidably inserted with the respective positive electrodes and the respective negative electrodes arranged alternately in the stacking direction and protruding outwards, wherein:

respective stepped portions are provided in respective inward end portions of the respective insertion spaces, respective inner surfaces of the respective stepped portions that are in contact with respective end portions of the respective first battery cell and the respective second battery cell of each of the plurality of pairs of battery cells are spaced apart from each other in a sliding direction of the plurality of pairs of battery cells, and respective end portions of the respective positive electrodes and the respective negative electrodes are in contact and overlap with each other when the respective positive electrodes and the respective negative electrodes of the respective first battery cell and the respective second battery cell of each of the plurality of pairs of battery cells are bent in the stacking direction to be connected to each other.

18. The vehicle of claim 17, further comprising a plurality of sub-cartridges, wherein each sub-cartridge of the plurality of sub-cartridges is configured to cover a respective space between the respective first battery cell and the respective second battery cell of the plurality of pairs of battery cells at an inlet side of the respective insertion space of a respective one of the plurality of main cartridges.

19. The vehicle of claim 18, wherein:

each sub-cartridge of the plurality of sub-cartridges comprises a respective first rib extended in a particular direction, each of the respective first ribs is provided at a position corresponding to a respective first positive electrode of the respective first battery cell and a respective second negative electrode of the respective second battery cell, and each of the respective first ribs comprises a respective first supporting protrusion supporting a respective end portion of a respective one of the respective first positive electrode or the respective second negative electrode when the respective first positive electrode or the respective second negative electrode is bent.

20. The vehicle of claim 19, wherein:

each of the plurality of main cartridges comprises a respective second rib extended in the particular direction at the inlet side where the plurality of pairs of battery cells are inserted, each of the respective second ribs are positioned at an opposite side to the respective first ribs in order to prevent a short-circuit when at least one of the respective positive electrodes and the respective negative electrodes are bent, and each of the respective second ribs comprise a respective second supporting protrusion supporting at least one other respective end portion of one of the respective positive electrodes or the respective negative electrodes.

* * * * *

UNITED STATES PATENT AND TRADEMARK OFFICE
CERTIFICATE OF CORRECTION

PATENT NO. : 12,438,226 B2
APPLICATION NO. : 17/987023
DATED : October 7, 2025
INVENTOR(S) : Lim et al.

Page 1 of 1

It is certified that error appears in the above-identified patent and that said Letters Patent is hereby corrected as shown below:

In the Claims

In Column 10, in Claim 10, Line 50, after "cell and" delete "each".

Signed and Sealed this
Twenty-fifth Day of November, 2025

John A. Squires
*Director of the United States Patent and Trademark Office*